Sept. 13, 1966   J. S. SCOGGIN ET AL   3,272,787
EXTRACTION OF SOLUBLE MATTER FROM POLYMER SOLIDS
Filed June 5, 1961   3 Sheets-Sheet 1

INVENTORS
J. S. SCOGGIN
L. T. PRICE
BY
Hudson & Young
ATTORNEYS

INVENTORS
J. S. SCOGGIN
L.T. PRICE
BY Hudson & Young
ATTORNEYS

Sept. 13, 1966  J. S. SCOGGIN ET AL  3,272,787
EXTRACTION OF SOLUBLE MATTER FROM POLYMER SOLIDS
Filed June 5, 1961  3 Sheets-Sheet 3

INVENTORS
J.S SCOGGIN
L.T. PRICE
BY
*Hudson & Young*
ATTORNEYS

United States Patent Office 3,272,787
Patented Sept. 13, 1966

3,272,787
EXTRACTION OF SOLUBLE MATTER FROM POLYMER SOLIDS
Jack S. Scoggin and Lowell T. Price, Bartlesville, Okla., assignors to Phillips Petroleum Company, a corporation of Delaware
Filed June 5, 1961, Ser. No. 114,727
3 Claims. (Cl. 260—93.7)

This invention relates to a method of extracting soluble matter from solid olefin polymers. In another aspect, it relates to apparatus suitable for the separation of catalyst or amorphous polymer from solid olefin polymers by solvent extraction.

When polymers of olefin monomers are prepared over organometallic catalyst systems, it is generally necessary to remove the catalyst from the polymer in the recovery process. Polymers of alpha olefins frequently contain an amorphous fraction which can be removed in order to increase the flexural modulus of the polymer. One of the most practical methods for removing either organometallic catalyst or amorphous fractions of polymer from solid olefin polymers is by solvent extraction.

According to our invention, we have provided an improved method and apparatus for the solvent extraction of soluble matter from polyolefin solids. In the method of our invention, the polyolefin solids containing soluble matter are contacted with a solvent for said soluble matter under turbulent conditions in a mixing vessel thereby dissolving the soluble matter in the solvent and leaving polymer solids. Separation of the resulting solution from the polymer solids is obtained by maintaining a relatively quiescent zone in a lower extension of the mixing vessel to that the solids settle therein. The settled polymer solids are then withdrawn from this extension and compacted while backwashing with a fresh solvent which is forced into the mixing vessel through said lower extension. The compacted polymer solids can then be passed to further recovery steps. The solution of solvent and soluble matter is withdrawn from the mixing vessel through an upward extension thereof. The solution passes through said extension in non-turbulent flow at a velocity below the transport velocity of the polymer solids. Preferably at least a portion of the withdrawn solution is vaporized to separate solvent from the residue of soluble matter. The vaporized solvent is condensed and at last a part of the resulting condensate is recirculated to the mixing vessel. The apparatus of our invention comprises an upright elongated vessel which has an enlarged center section of substantially uniform cross-section and extended upper and lower sections having uniform cross-sections substantially less than said center section, agitation means disposed within the center section, means for introducing feed material comprising the polymer solids and soluble matter to said center section, means for introducing wash liquid to the bottom of said lower section, means for withdrawing solids from the bottom of said lower section, and means for withdrawing liquid from the top of said upper section. In said mixing vessel, said upper and lower sections are of sufficient length to provide volumes substantially unaffected by the agitation means and of sufficient diameter to permit upward liquid flow at a velocity below the transport velocity of the polymer solids. In the preferred aspect of our invention, the apparatus also includes a compression auger which is connected at its inlet end to the bottom of said lower section. The compression auger contains means for removing compacted solids from its other end and means for introducing a wash liquid to an intermediate point of said auger.

It is an object of our invention to provide an improved method for extracting soluble matter from polyolefin solids. Another object is to provide apparatus suitable for extracting soluble material such as catalyst or atactic polymer from solid polymers such as polypropylene with a minimum of contacting and separating steps. Another object of our invention is to provide a process and apparatus which enable the removal of catalyst and/or atactic polymer from solid polypropylene with a minimum of handling and pumping of slurries and solutions. Other objects, advantages and features of our invention will be apparent to those skilled in the art from the following discussion and drawing in which:

Figure 1:
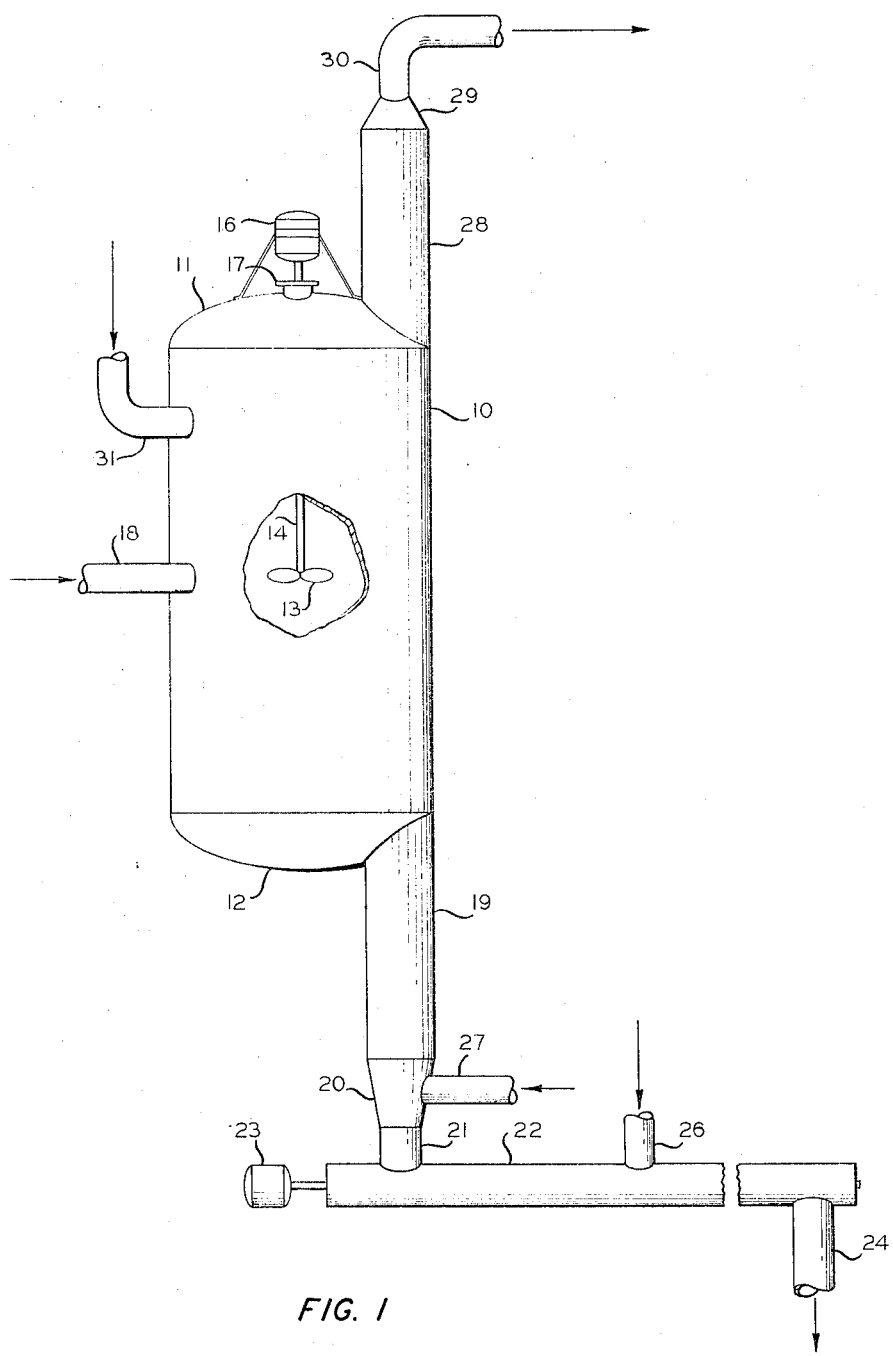
FIGURE 1 is a diagram of our improved contacting apparatus.

While our invention can be applied to advantage in its various aspects to polymers of olefins broadly, it is particularly useful in the recovery of polymers of alpha olefins from a polymerization process over an organometallic catalyst system. Ordinarily these alpha olefins will have from 3 to 6 carbon atoms per molecule such as propylene, 1-butene, 1-pentene, 4-methyl-1-pentene, 3-methyl-1-butene, 3,3-dimethyl-1-butene, and the like. In a preferred aspect of our invention, polypropylene is treated to remove catalyst and/or atactic fraction therefrom. In the organometallic catalyst systems which are used in the processes to which our invention is preferably directed, the organometal employs a non-transition metal of Groups I, II, or III of the periodic system; for example, aluminum, beryllium, zinc, magnesium, lithium, or sodium in which the metal is attached to at least one hydrocarbon radical and the remaining valences, if any, are satisfied by halogen or hydrogen. Complex alkyls of aluminum and alkali metals, for example, lithium aluminum tetrapropyl, are sometimes used. Of these catalysts, we prefer the dialkylaluminum chlorides or bromides in which the alkyl radicals have from 1 to 8 carbon atoms. In the catalyst system, the organometal is used with a transition metal compound such as the halides of the Groups IV to VI metals, for example, titanium, vanadium, zirconium, hafnium, thorium, uranium, niobium, tantalum, chromium, molybdenum or tungsten. Of these, the chlorides of titanium are preferred and titanium trichloride is the best in the polymerization of propylene. The extraction method and apparatus of our invention are particularly useful for the removal of catalyst such as diethylaluminum chloride and titanium trichloride. Preferably, the polymerization is carried out in the liquid monomer although an inert diluent can be employed. Temperatures in the range of about 90 to 160° F. and residence times of about 1 to 15 hours are preferred for the polymerization of alpha olefins such as propylene. The catalyst is used in a weight ratio of about 0.5:1 to 20:1, preferably about 1:1 to 4.5:1 $TiCl_3$ to dialkylaluminum halide.

In the polymerization effluent the ratio of polymer to catalyst would ordinarily range from about 100 to 1000, or higher, pounds of polymer per pound of catalyst. In most applications, it is desirable that even minute amounts of catalyst be removed prior to fabrication of the polymer. Solvent extraction techniques are ordinarily used for this purpose and a number of suitable solvents are known for this operation. Solvents such as alcohols, ketones, amines, glycols, ethers, organic acids and the like can be employed. We prefer to use aliphatic alcohols having about 1 to 5 carbon atoms, or low molecular weight aliphatic acids having about 2 to 8 carbon atoms per molecule, or anhydrides of these acids. Examples of the preferred solvents for catalyst removal are methanol, ethanol, propanol, isopropanol, butanol, pentanol, acetic acid, propionic acid, acetic anhydride, propionic anhydride and the like. The polymer as it is removed from the polymerization zone is in the form of relatively finely divided solids, ordinarily of a size that will pass through 20 mesh (U.S. Standard Sieve). The amount of solvent can vary widely depending upon the amount of catalyst in the polymer but ordinarily at least enough solvent is used to slurry the polymer, even though inert diluent or liquid monomer may also be present. The optimum amount of solvent required in order to make the desired extraction to meet the polymer specification can readily be determined in each case.

The alpha olefin polymers and particularly polypropylene ordinarily contain at least some atactic polymer in addition to the isotactic fraction which predominates. The amount of atactic polymer is usually in the range from about 15 percent of the total polymer to a negligible amount. Hydrocarbon solvents are ordinarily used for this extraction and the hydrocarbon solvent chosen depends on the amount of polymer it is desired to extract since the solubility of the polymer fractions vary somewhat from solvent to solvent. Normally liquid hydrocarbons are most frequently used having from 5 to 12 carbon atoms per molecule and preferably normal paraffins such as n-pentane, n-hexane or n-heptane are employed. Here again the amount of solvent employed depends upon the amount of amorphous polymer which is to be removed but will ordinarily be at least enough to slurry the polymer and insure good mixing in the mixing vessels.

Referring now to FIGURE 1 of the drawings, the apparatus of my invention will be described. The apparatus enables substantial savings in equipment and especially in pumps since all of the mixing and separation are carried out in one vessel and maximum advantage is taken of gravity flow in the contacting and separating the polymer and solvent. In the preferred embodiment of our apparatus as shown in FIGURE 1, the mixing vessel has a vertically elongated cylindrical shell 10 which together with top closure 11 and bottom closure 12 define a central mixing volume where most of the contacting between the polymer solids and solvent occurs. A portion of this shell 10 has been cut away to show a centrally disposed agitator 13 within the mixing vessel. Agitator 13 is mounted on shaft 14 which is connected to motor 16 or an equivalent prime mover mounted on top of the vessel. Shaft 14 passes through a packing gland 17 in top closure 11. Feed conduit 18 is provided centrally disposed in shell 10, preferably adjacent the zone of mixing created by agitator 13. Polymer solids with the associated soluble material which is to be removed by extraction is introduced through feed conduit 18. The proportions of shell 10 can vary substantially provided sufficient agitation means are provided to insure efficient mixing and utilization of the tank volume. Preferably the length to diameter ratio of shell 10 is from about 1:1 to 2:1.

Depending from the lower end of the center section of the mixing vessel is a settling leg which is defined by an elongated cylindrical shell 19 attached at its upper end to the bottom closure member 12 and shell 10. Although shell 19 can be connected in other positions on closure 12, it should be offset from the center line of shell 10 and preferably positioned at the periphery of shell 10 or affixed thereto at at least one point as shown in FIGURE 1. By offsetting the settling leg in this manner, a minimum of the turbulence created by agitator 13 is transferred into the settling leg so that a relatively quiescent zone is developed with a minimum of leg length. The diameter of shell 19 should be substantially less than the diameter of shell 10 and preferably is about ⅕ to ⅓ the diameter of shell 10.

The length to diameter ratio should be at least about 3:1 to 10:1 in order to insure a relatively quiescent zone at its lower extremity. Preferably the length to diameter ratio of shell 19 is in the range of about 3:1 to 7:1 and the length of shell 19 is ordinarily about ¾ to 1½ times the length of shell 10.

While a turbulent zone is maintained within shell 10 to insure efficient contact between the polymer and the solvent, the settling leg defined by shell 19 is proportioned to provide a settling rate of polymer solids of about 0.1 to 3 feet per minute. The settling polymer solids are also contacted with rising solvent which enters at the bottom of settling leg so that the length of this leg should be sufficient to insure adequate washing of the polymer. The bottom of shell 19 is connected by conical closure member 20 to inlet 21 of compression auger 22. Compression auger 22 can be a common compression extruder or pressurized auger conveyor with a restricted opening at its discharge end to insure that a compacted mass of polymer solids is built up within the discharge end of the auger. The screw of auger 22 is driven by motor 23 and the polymer solids are compacted and ultimately forced out of auger 22 through discharge opening 24. It is essential that a compacted mass of polymer solids be built up in the discharge end of auger 22 in order that a seal be maintained and there is no loss of pressure from the mixing vessel. Also, as the polymer solids are forced by the auger into the compacted mass, the more fluid material, that is the solvent, is expressed from the polymer solids and forced backwardly into the settling leg. Additional backwashing is provided by the introduction of fresh solvent at an intermediate point of auger 22 through conduit 26. Fresh solvent thus introduced flows countercurrently to the polymer in auger 22 and passes upwardly into the settling leg serving further to remove soluble matter from the polymer. Additional fresh solvent can be introduced to the bottom of the settling leg through conduit 27. Substantially all of the fresh solvent introduced to the extraction process enters by way of auger 22 or conduit 27 and travels upwardly through the settling leg defined by shell 19. This fact must be borne in mind in the proportioning of shell 10 so that sufficient diameter is provided that the upward flow of solvent therethrough does not exceed the transport velocity of the polymer solids but instead enables the settling rate indicated above.

Extending from the upper portion of the central section of the mixing vessel is a rising leg as defined by shell 28 which is attached to its lower end to top enclosure member 11 and shell 10. For the same reasons as pointed out in connection with the settling leg, it is desirable that the rising leg be offset near or at the periphery of shell 10 so that a minimum of turbulence is transferred from the contacting zone into the rising leg. The proportions of the rising leg are approximately the same as given in connection with the settling leg and the diameter of the rising leg must also be large enough that the velocity of the rising solution does not exceed the transport velocity of the polymer particles. The upper portion of shell 28 is connected by conical closure member 29 to a solution withdrawal conduit 30. The solvent can be recovered from this solution and is returned to the mixing vessel, entering through conduit 31 in shell 10. Additional entry ports of this nature can be provided if desired.

Figure 2:
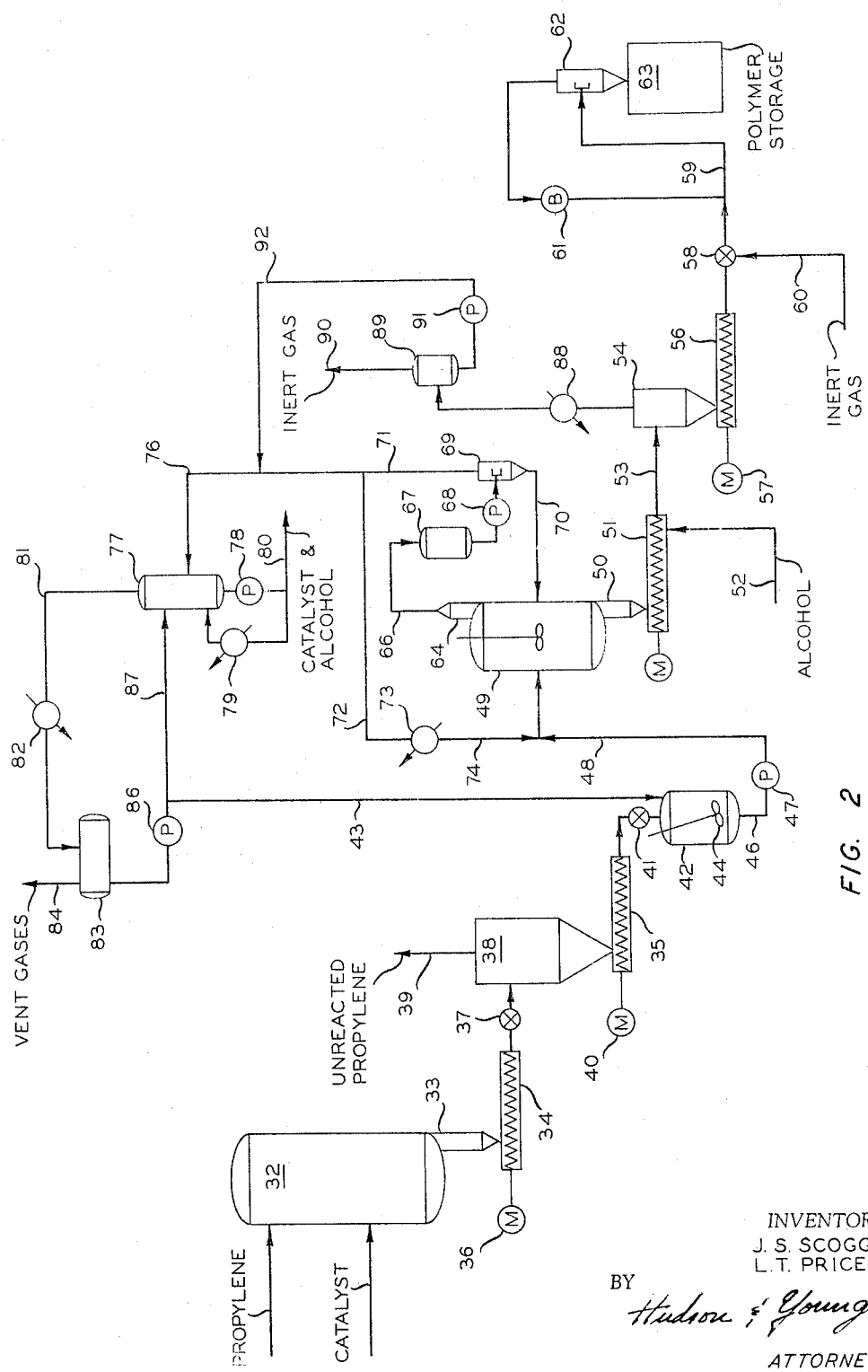
FIGURE 2 is a flow diagram of one aspect of the process of our invention wherein unreacted monomer is removed from the polymerization effluent prior to extraction of catalyst from the polymer.

Referring now to FIGURE 2, one aspect of the process of our invention is shown in which the above-described mixing and separation apparatus is used to good advantage. Propylene and catalyst are introduced to a reactor 32 of conventional design and provided with the necessary agitation and temperature control means. The diethylaluminum chloride is added at a rate of about 0.0001 to 0.001 pound per pound of propylene feed and sufficient titanium trichloride is added for a productivity of about 100 to 1,500 pounds of polypropylene per pound of $TiCl_3$. Polymer settles from reactor 32 in settling leg 33 and passes into compression auger 34 driven by motor 36.

Fresh propylene can be introduced into compression auger 34 and/or into the lower portion of settling leg 33 to pass countercurrently to the polymer and wash catalyst back into the reactor. The reactor effluent is then passed through a pressure reducing valve 37 into flash dryer 38. Unreacted propylene which has served as the reaction medium and which is carried out of the reactor with the polymer solids is vaporized in flash dryer 38 and removed overhead through conduit 39. This unreacted propylene is recovered and after purification can be returned to the polymerization reaction. Polymer solids which have thus been separated from the unreacted monomer fall into compression auger conveyor 35 driven by motor 40 and are passed through valve 41 into reslurry vessel 42. Solvent from a source to be described enters reslurry vessel 42 by way of conduit 43 and a pumpable slurry is formed therein by agitator 44. This slurry is then passed via conduit 46 to pump 47 and pressurized via conduit 48 into extraction vessel 49.

When removing catalyst from polypropylene, it is desirable that an extraction temperature of about 250 to 300° F. be maintained and with the solvents commonly used, such as isopropyl alcohol, an elevated pressure is required to keep the solvent in the liquid phase. Since an elevated pressure is required in contacting vessel 49, it is necessary that the polymer solids removed from flash dryer 38, be reslurried so that they can be pumped by pump 47 to a vessel of elevated pressure.

As described in connection with the apparatus shown in FIGURE 1, the polymer solids pass through settling leg 50 into compression auger 51 while fresh alcohol introduced to auger 51 via conduit 52 flows countercurrently to the polymer passing therethrough. Compacted polymer solids are then forced by way of conduit 53 into dryer hopper 54. In dryer hopper 54, the polymer solids are contacted with heated inert gas thereby vaporizing the residual solvent which has been retained on the solids. Polymer solids are again passed to auger conveyor 56 which is driven by motor 57 and are forced through valve 58 into conveying system 59. Inert gas is introduced by way of conduit 60 and flows back through auger conveyor 56 into dryer hopper 54 vaporizing solvent from the polymer solids. Blower 61 provides a stream of air or inert gas which conveys the polymer solids through conduit 59 into cyclone collector 62 from which the polymer solids drop into storage container 63.

Clarified solution of alcohol and dissolved catalyst rises in rising leg 64 connected to the top of contacting vessel 49 and passes through conduit 66 into receiving vessel 67. From vessel 67 the solution is passed by pump 68 through cyclone collector 69 wherein entrained polymer solids are removed and returned to contacting vessel 49 by way of conduit 70. A solution stream passing through conduit 71 from collector 69 is divided and a portion thereof is passed through conduit 72 and heated in heat exchanger 73. This heated solution is then passed through conduit 74 and combined with the incoming polymer slurry in conduit 48. The desired temperature in mixing vessel 49 can thus be maintained. The remainder of the solution in conduit 71 is passed through conduit 76 into reboiler or fractionation column 77. Solution in reboiler 77 is circulated by pump 78 through heater 79 and back into the reboiler so that solvent is evaporated leaving a residue of catalyst and alcohol which is removed from the system through conduit 80. The vaporized solvent passes overhead from reboiler 77 through conduit 81 to condenser 82 wherein the solvent is condensed and the condensate is passed to receiver 83.

Uncondensed gases comprising monomer and some alcohol are vented from receiver 83 through conduit 84. The condensed solvent is passed from receiver 82 by pump 86, a portion of the condensate being returned by way of conduit 87 to reboiler 77 and the remainder being passed by conduit 43 to reslurry vessel 42 as previously described.

Inert gases carrying volatilized solvent from dryer hopper 54 pass through condenser 88. The solvent is thus condensed and thereafter separated from the inert gas in receiver 89. Inert gases pass overhead through conduit 90 while the solvent is passed by pump 91 through conduit 92 joining the solvent in conduit 76 on its way to reboiler 77. It can be seen from this process that very efficient use is made of the catalyst solvent. The only fresh solvent which is added is that necessary to offset the solvent removed with the residual catalyst from reboiler 77 and as uncondensed solvent vapors which are vented with the inert gas in conduit 90 and with the unreacted monomer in conduit 84. The process also enables the recovery of dry polymer solids with relatively little handling since most of the liquid is removed from the solids in the compression auger 51 which also serves as a countercurrent contacting zone for the polymer solids and fresh solvent.

Figure 3:
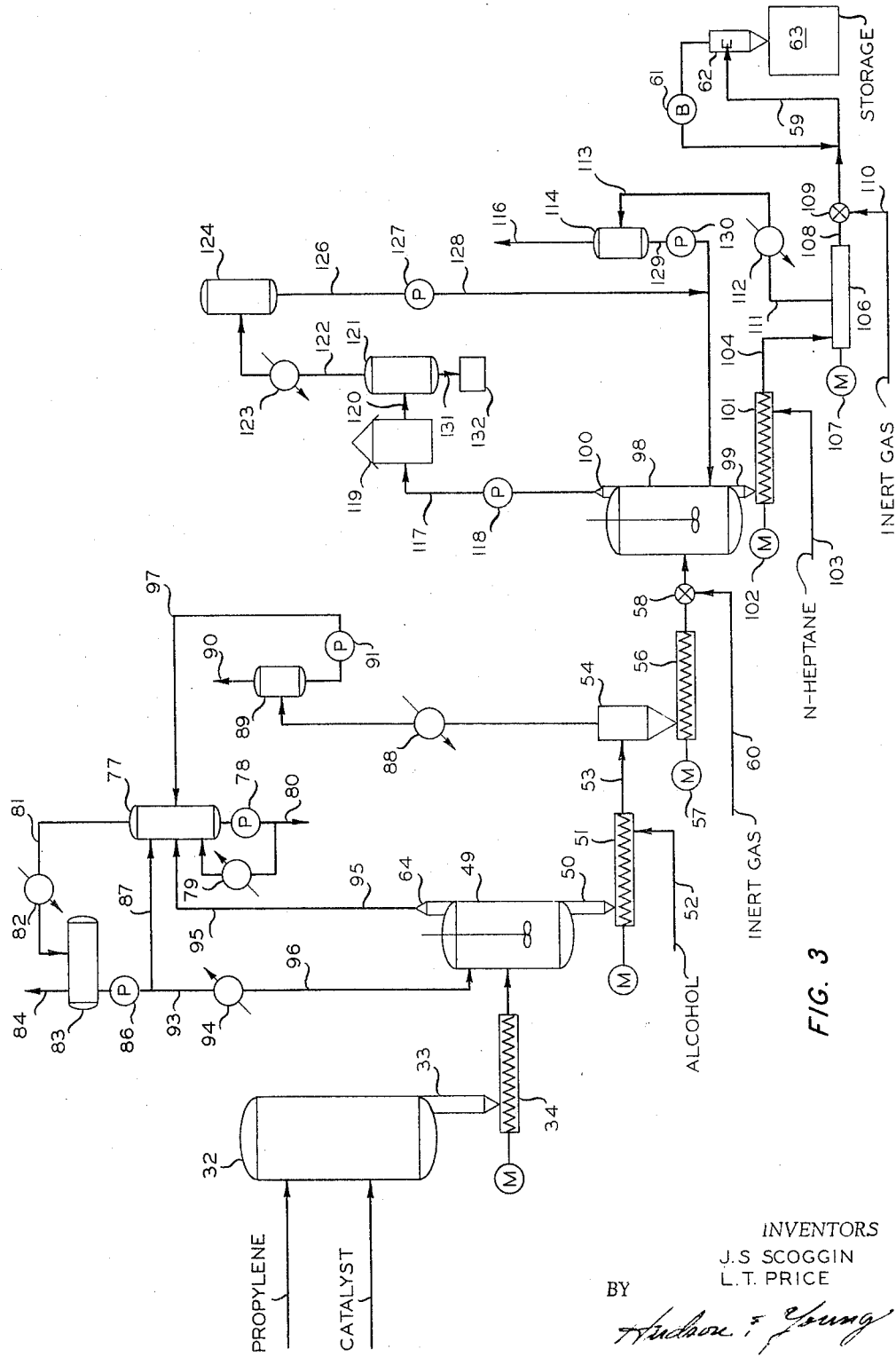
FIGURE 3 is a flow diagram employing the improved process steps of our invention for the removal of both catalyst and amorphous polymer from a normally solid polypropylene.

As has been previously explained, the process of our invention can also be used to advantage for the removal of amorphous polymer from a substantially crystalline polymer. A process in which two contacting steps are used in series for the removal first of catalyst and then of atactic polymer is shown in FIGURE 3. The same numerals are used in FIGURE 3 as are used in FIGURE 2 to indicate corresponding features. In FIGURE 3, however, the reactor effluent which is predominantly polymer solids with the associated catalyst and unreacted propylene is passed from auger 34 directly into the contacting vessel 49. In place of auger 34, it is possible to use a fluid transporting medium of propylene, fresh alcohol or recycle alcohol from accumulator 83 to carry the polymer to vessel 49. The extraction with alcohol in contacting vessel 49 is the same as described in connection with FIGURE 2 except that the solution in rising leg 64 is passed directly through conduit 95 to column 77 and vaporized solvent from column 77 which is condensed and accumulated in receiver 83 is passed in part through conduit 93 to heater 94 and thence through conduit 96 returning directly to the contacting vessel 49. In the embodiment shown in FIGURE 3, the uncondensed gases from receiver 83 and conduit 84 contain a substantial propylene fraction since all of the unreacted propylene from the effluent polymer solids is removed in the catalyst extraction step. The gases in conduit 84 are, therefore, passed to propylene recovery steps so that this propylene can be returned to the reactor. Since the propylene is recovered from the reactor effluent in this manner, there is no need for an intermediate pressure reducing stage as shown in flash vessel 38 of FIGURE 2. By not reducing the pressure on the polymerization effluent in order to remove unreacted propylene, the use of a reslurry vessel is avoided and the polymer can be passed directly into pressurized contacting vessel 49. Since a reslurry vessel is not used, that condensed solvent from receiver 83 which is not returned directly to column 77, is passed to contacting vessel 49 and the temperature in this contact vessel is maintained by heating this solvent return stream in heater 94. It can be seen that there is substantial savings in equipment in this embodiment over that shown in FIGURE 2 by removing the unreacted propylene in the catalyst extraction step. On the other hand, substantially higher amounts of solvent are removed from the extraction system through conduit 84. In FIGURE 3, the condensed solvent which is removed from the polymer solids by the inert gas in conveyor 56 and dryer hopper 54 is passed from receiver 89 by pump 91 through conduit 97 directly to reboiler 77. This flow is substantially as shown in FIGURE 2.

The dried polymer solids from conveyor 56 pass through valve 58 into a second contacting vessel 98 for the removal of atactic polymer. Like vessel 49, vessel 98 is equipped with a settling leg 99 and a rising leg 100. The polymer solids are contacted at about atmospheric pressure and a temperature in the range of about 150 to 200° F. with a normally liquid paraffinic hydrocarbon, preferably normal heptane. The polymer solids settle in settling leg 99 and pass into compression auger 101 which is powered by motor 102. Compression auger 101 acts similarly to compression auger 51 and expresses solvent from the polymer solids while at the same time fresh solvent is introduced to the auger through conduit 103 passing countercurrently to the solid polymer and extracting more of the soluble polymer therewith. The polymer solids having had a substantial amount of the atactic polymer removed are then passed through conduit 104 to conveyor 106 which is powered by motor 107. In conveyor 106, the solids are contacted with an inert gas to vaporize the residual normal heptane associated therewith. The solids are then passed through conduit 108 and valve 109 into pneumatic conveyor conduit 59 through which the polymer solids are carried to cyclone collector 62 and storage bin 63. Inert gas is introduced through conduit 110 and passes in countercurrent flow to the polymer solids in conveyor 106, vaporizing normal heptane. The vaporized normal heptane and inert gas are passed from conveyor 106 through conduit 111 to condenser 112. The condensed solvent and inert gas pass from condenser 112 through conduit 113 to receiver 114 wherein the inert gas is separated from the condensate and vented through line 116.

A clarified solution of solvent and atactic polymer rises from contacting vessel 98 in rising leg 100 and passes overhead through conduit 117 and pump 118 to gas fired flash preheater 119. The heated solution is then passed through conduit 120 to flash tank 121. The solvent which is flashed into vapor in flash tank 121 passes overhead through conduit 122 to condenser 123 and then as condensate to receiver 124. This condensate is returned through conduit 126 by pump 127 and conduit 128 to contacting vessel 98. The solvent which has been removed from the polymer solids by inert gas and collected in receiver 114 is passed through conduit 129 by pump 130 and joins the solvent in line 128 being returned to contacting vessel 98. A residue of atactic polymer is removed from flash vessel 121 through conduit 131 to storage drum 132 for suitable disposal.

In order to illustrate the process of our invention further, the following examples are given. The conditions and proportions presented in these examples are intended to be typical only and should not be construed to limit our invention unduly.

EXAMPLE I

Propylene is polymerized continuously over a catalyst of titanium trichloride and diethylaluminum chloride in a tower reactor employing a temperature of 100° F., a pressure of 250 p.s.i.a., and a residence time of 8 hours. Liquid propylene which is the reaction diluent is evaporated, condensed and recycled to control the temperature of the exothermic reaction. The solids content in the reactor is about 25%. The effluent stream is reduced to a pressure of 16.7 p.s.i.a. and a temperature of 150° F. in a drying zone to vaporize most of the unreacted propylene and the material which is not vaporized is reslurried in isopropyl alcohol at atmospheric pressure. This slurry is then pumped to a contacting vessel maintained at a pressure of 175 p.s.i.a. and a temperature of 280° F. wherein the isopropyl alcohol and the solid polymer are intimately contacted by mechanical agitation for removal of catalyst. The polymer solids settle in a settling leg of the vessel and are contacted with fresh isopropyl alcohol in a compression auger which is 8 inches in diameter and 20 feet long. The solids are then contacted with an inert gas at a pressure of about 16.7 p.s.i.a. and 200° F. to evaporate the residual associated alcohol from the polymer. The dry solids are then passed to storage. A solution of isopropyl alcohol and catalyst which has been removed from a rising leg of the contacting vessel is boiled for evaporation of the alcohol which is condensed and recycled to the reslurry tank. The contacting vessel has a center shell section 6 feet in diameter and 10 feet in length and each of the rising and settling legs is 20 inches in diameter and 10 feet in length. The stream flows in pounds per hour are shown in Table I as a material balance with reference to conduits as numbered in FIGURE 2.

*Table I.—Material balance for FIGURE 2*

[Pounds per hour]

| | Reactor Feed | Reactor Effluent | Line 30 | Line 43 | Line 46 | Line 52 | Line 53 | Line 66 | Line 70 | Line 74 | Line 80 | Line 84 | Line 60 | Line 90 | Line 92 | Polymer Storage |
|---|---|---|---|---|---|---|---|---|---|---|---|---|---|---|---|---|
| Polypropylene | | 3,715 | | | 3,715 | | 3,715 | 30 | 30 | | | | | | | 3,715 |
| Titanium Trichloride | 5.6 | 5.6 | | | 5.6 | | 0.5 | 14 | Trace | 9.9 | 5.1 | | | | | |
| Diethylaluminum Chloride | 1.3 | 1.3 | | | 1.3 | | Trace | | | | 1.3 | | | | | |
| n-Decane | 2 | 2 | | | 2 | | Trace | 5.8 | | 3.8 | 2 | | | | | |
| Propylene | 4,300 | 390 | 332 | 611 | 669 | | 1.5 | 1,967 | 4 | 1,295 | | 57 | | 1 | | |
| Propane | 43 | 43 | 37 | 61 | 67 | | 0.15 | 198 | 0.4 | 131 | | 5.9 | | 0.1 | | |
| Hydrogen | 0.05 | 0.05 | 0.05 | | | | | | | | | | | | | |
| Isopropyl Alcohol | | | | 15,640 | 15,640 | 144 | 434 | 45,740 | 90 | 30,300 | 95 | 12 | | 37 | 397 | |
| Inert Gas | | | | | | | | | | | | | 150 | 150 | | |
| Soluble Polymer | | 195 | | | 195 | | 195 | | | | | | | | | 19 |

EXAMPLE II

Propylene is continuously polymerized over a catalyst of diethylaluminum chloride and titanium trichloride in a pipe-loop reactor at a temperature of 180° F., a pressure of 650 p.s.i.a., and a residence time of 3 hours. The solids content in the reactor is about 25%. Settled polymer solids are passed from the reactor as an effluent stream passing directly to contacting vessel maintained at a pressure of 250 p.s.i.a and at a temperature of 280° F. In this vessel, the polymer solids are contacted with isopropyl alcohol in the same manner as described in connection with Example I. The polymer solids after drying with inert gas are passed to a second contact vessel where they are mixed with normal heptane at atmospheric pressure and at a temperature of 180° F. Atactic polymer is dissolved by the normal heptane and the resulting solution is passed through a rising leg and then to a heater where it is flashed at a pressure of 90 p.s.i.a. and 350° F. Atactic polymer is removed as bottoms and the normal heptane is recirculated to the contacting vessel. Polymer solids are dried with inert gas and the evaporated normal heptane is likewise recirculated. The material balance for this process is given in Table II with reference to the conduits as numbered in FIGURE 3.

Table II.—Material balance for FIGURE 3

[Pounds per hour]

| | Reactor Effluent | Line 52 | Line 53 | Line 60 | Line 80 | Line 84 | Line 90 | Line 96 | Line 97 | Line 103 | Line 104 | Line 110 | Line 116 | Line 117 | Line 131 | Polymer Storage |
|---|---|---|---|---|---|---|---|---|---|---|---|---|---|---|---|---|
| Propylene | 436 | | 12 | | | 428 | 8 | 1,065 | 4 | | | | | | | |
| Propane | 48 | | 1.3 | | | 47 | 0.8 | 121 | 0.5 | | | | | | | |
| Titanium Trichloride | 14.0 | | | | 14.0 | | | | | | | | | | | |
| Diethylaluminum Chloride | 1.9 | | | | 1.9 | | | | | | | | | | | |
| n-Decane | 44 | | 1.2 | | 42.8 | | | | | | | | | 1.2 | 1.2 | |
| Isopropyl Alcohol | | 372 | 484 | | 186 | 172 | 14 | 17,068 | 470 | | | | | | | |
| n-Heptane | | | | | | | | | | 87 | 436 | | 12 | 17,004 | | |
| Inert Gas | | | | 24 | | | 24 | | | | | 24 | 24 | | | |
| Isotactic Polymer | 3,924 | | 3,926 | | | | | | | | 3,924 | | | | | 3,924 |
| Atactic Polymer | 436 | | 436 | | | | | | | | | | | 436 | 436 | |

As will be apparent to those skilled in the art, various modifications can be made in our invention without departing from the spirit or scope thereof.

We claim:

1. A process for removing soluble organometallic catalysts and other soluble matter from polyolefin solids which comprises contacting said solids with a solvent for said organometallic catalyst, said solvent being one selected from the group consisting of low molecular weight organic acids, alcohols and mixtures thereof, under turbulent conditions in a mixing vessel whereby said organometallic catalyst is dissolved by said solvent leaving polymer solids; maintaining a quiescent zone in a lower extension of said vessel so that said polymer solids settle therein, said quiescent zone having a diameter in the range of from 1/5 to 1/3 the diameter of said mixing vessel, a height in the range of from 3/4 to 1½ times the height of said mixing vessel and a length to diameter ratio in the range of from 3/1 to 7/1 whereby sufficient quiescence is maintained in said zone to effect the settlement of said polymer solids therein; withdrawing settled polymer solids from said extension; compacting said withdrawn solids while backwashing same with fresh solvent for said other soluble matter, said solvent being forced into said mixing vessel through said lower extension; passing the compacted polymer solids to further recovery steps and withdrawing solution of soluble matter in solvent through an upward extension of said mixing vessel in non-turbulent flow at a velocity below the transport velocity of said solids.

2. The process of claim 1 wherein said polyolefin is polypropylene, said soluble catalyst matter is alkylaluminum titanium halide catalyst, said solvent is isopropyl alcohol, and said further recovery steps include vaporizing alcohol from the polymer solids with hot inert gas and treating these polymer solids according to the steps of claim 1 wherein said other soluble matter is atactic polypropylene and said fresh solvent is n-heptane.

3. The process of claim 1 wherein said soluble matter is amorphous polymer and said solvent is a normally liquid hydrocarbon.

References Cited by the Examiner

UNITED STATES PATENTS

| | | | |
|---|---|---|---|
| 2,560,147 | 7/1951 | Anderson | 23—270 |
| 2,891,008 | 6/1959 | Weston et al. | 210—208 |
| 2,907,712 | 10/1959 | Eidsress et al. | 210—208 |
| 2,943,082 | 6/1960 | Cottle | 260—93.7 |
| 2,943,083 | 6/1960 | Kolling et al. | 260—94.9 |
| 2,949,447 | 8/1960 | Hawkins et al. | 260—93.7 |

FOREIGN PATENTS 601,298   7/1960   Canada.

JOSEPH L. SCHOFER, *Primary Examiner.*

JAMES A. SEIDLECK, MORRIS LIEBMAN,
*Examiners.*

L. EDELMAN, E. M. OLSTEIN, S. ASTOR,
*Assistant Examiners.*